(No Model.) 2 Sheets—Sheet 1.
J. REIMANN.
COMBINATION HORSE COLLAR AND HAMES.
No. 568,208. Patented Sept. 22, 1896.
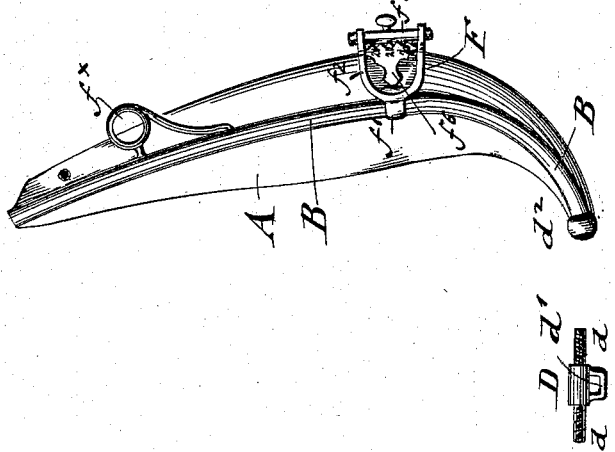
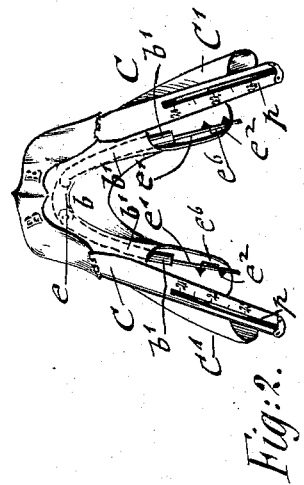
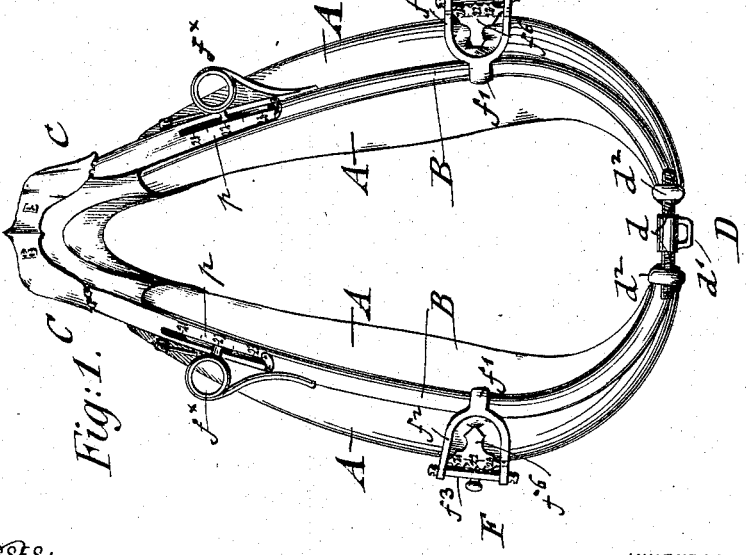
WITNESSES:
INVENTOR
Johannes Reimann
BY
ATTORNEYS.

(No Model.) 2 Sheets—Sheet 2.
J. REIMANN.
COMBINATION HORSE COLLAR AND HAMES.
No. 568,208. Patented Sept. 22, 1896.
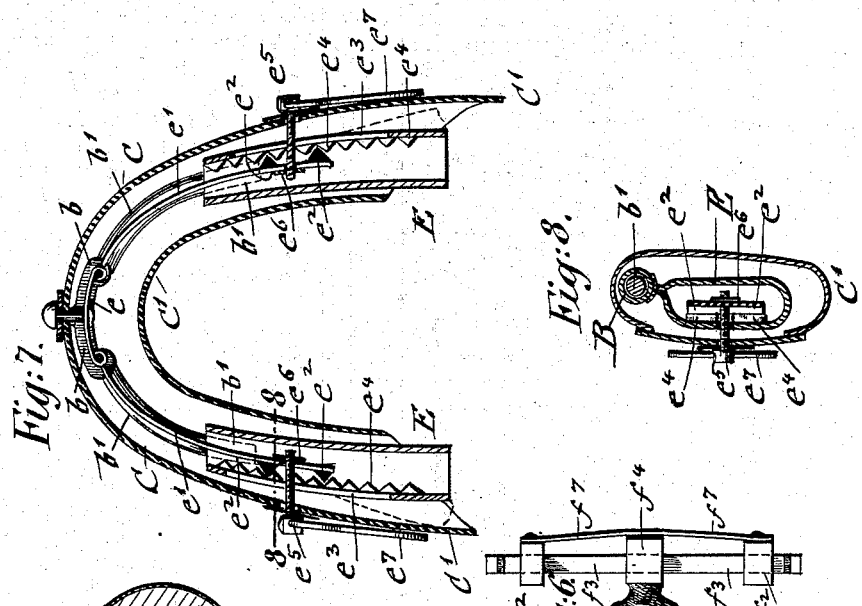
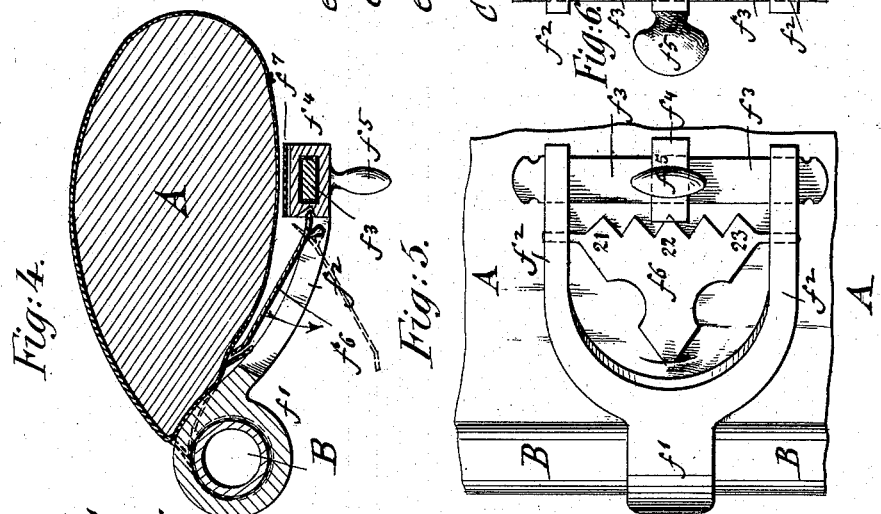
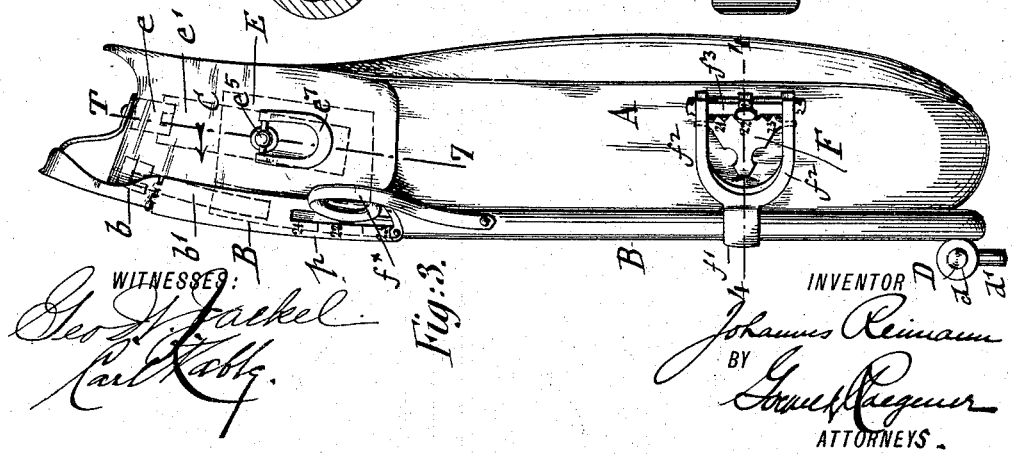

UNITED STATES PATENT OFFICE.

JOHANNES REIMANN, OF UNION HILL, NEW JERSEY.

COMBINATION HORSE COLLAR AND HAME.

SPECIFICATION forming part of Letters Patent No. 568,208, dated September 22, 1896.

Application filed May 1, 1896. Serial No. 589,880. (No model.)

*To all whom it may concern:*

Be it known that I, JOHANNES REIMANN, a citizen of the Empire of Germany, residing in Union Hill, (Weehawken P. O.,) in the county of Hudson and State of New Jersey, have invented certain new and useful Improvements in a Combination Horse Collar and Hame, of which the following is a specification.

This invention relates to an improved combination horse collar and hame in which the hame is formed as a part of the collar and capable of adjustment as to width and length, so that it can be readily adapted to the size of the horse's neck, so that a strong yet light and snugly-fitting horse collar and hame is obtained.

The invention consists of a combination horse collar and hame in which the hame is made as a part of the collar and provided at the lower end with a coupling formed of a transverse right and left hand screw that engages fixed nuts at the lower ends of the hame, said right and left hand screw being provided with a central wing-shaped handle for turning the screw in adjusting the collar and hame to the width of the horse's neck.

The invention consists, secondly, of an extension device arranged at the upper end of the collar and hame by which the length of the collar and hame can be adjusted, so that the collar and hame can be fitted to any length of neck.

The invention consists, thirdly, of adjustable draft-clips arranged at the sides of the collar and hame, so that the connection of the traces with the draft-clips can be shifted in proportion to the length of the collar and hame, as will be fully described hereinafter and finally pointed out in the claims.

In the accompanying drawings, Figure 1 represents a front elevation of my improved combination horse collar and hame, showing the same in normal position ready for use. Fig. 2 is also a front elevation of the same, showing the coupling-screw at the lower end and the upper extensible yoke-shaped portion detached from the main portions of the collar and hame. Fig. 3 is a side elevation of my improved combination collar and hame. Fig. 4 is a horizontal section through one of the main portions and draft-clips of the hame, taken on line 4 4, Fig. 3, and drawn on a larger scale. Figs. 5 and 6 are respectively a front and an end elevation of one of the adjustable draft-clips. Fig. 7 is a detail vertical section of the upper extensible yoke-shaped portion of the combination collar and hame; and Fig. 8 is a detail horizontal section on line 8 8, Fig. 7.

Similar letters of reference indicate corresponding parts.

Referring to the drawings, A A represent the main portions of the collar, and B B the sections of the hame, which are arranged at the front edge of the main portions A A and firmly connected therewith. The hame-sections B B are made of gas-pipe in the usual manner and covered with leather, which is extended over the stuffed main portions of the collar and firmly stitched together at the seams and along the hame-sections. An extensible yoke-shaped portion C is arranged at the upper end of the collar and hame, by which the length of the collar and hame is adjusted, while the width of the collar is adjusted by a coupling device D, arranged at the lower end of the hame-sections B B.

The coupling device D consists of a right and left hand screw $d$, that is provided at the center with a wing-shaped handle portion $d'$, the threaded ends of the adjusting-screw $d$ engaging interiorly-threaded nuts $d^2$ at the lower ends of the hame-sections, as shown in connected position in Fig. 1 and in detached position in Fig. 2. When it is desired to adjust the main portions A A and hame-sections B B to the width of the horse's neck, the right and left hand screw $d$ is turned on its axis by the handle $d'$ in one or the opposite direction, whereby both sections of the combination collar and hame are either moved toward or away from each other until the proper adjustment of the collar and hame to the neck is obtained. When it is desired to remove the collar and hame from the neck, the coupling is extended to its full extent, so that the collar can be readily slipped over the head of the horse, it being replaced in position when required for use, then adjusted again to the width of the neck by turning the coupling-screw.

The extensible yoke C is made of a stiff leather covering C', to the upper part of which is riveted a cross-strap $b$, to the ends of which are hinged rods $b'$, that are inserted into the upper ends of the hame-sections B B, said rods serving for guiding the yoke C when raising or lowering the same. Back of the cross-strap $b$ is riveted to the covering C' a second cross-strap $e$, to each end of which is hinged a strap $e'$, provided with teeth $e^2$ at the lower end, which straps are inserted into the upper ends of sheet-metal boxes E, that are attached to the hame-sections B B and located in the upper ends of the main portions of the collar, as shown in dotted lines in Fig. 3 and in full lines in Fig. 8. The boxes E are provided with slots $e^3$ and interior rack-teeth $e^4$ alongside of the slots. The toothed end of each strap $e'$ is adapted to engage with the rack-teeth $e^4$ of the box E and held in engagement therewith by a clamping-screw $e^5$, which passes through the slot $e^3$ of the box E and into a nut $e^6$ on the strap $e'$, as shown in Fig. 7, said screw being provided at its outer end with a pivoted U-shaped handle $e^7$, by which the screw can be readily turned in one or the other direction, so as to release the teeth $e^2$ from the teeth $e^4$ in the box E, or so as to engage the strap $e'$ and clamp the teeth to the box E.

When the yoke C is to be adjusted in upward or downward direction, the straps $e'$ are first released from engagement with the rack-teeth of the boxes E, after which the yoke C is raised or lowered according to the length of the neck of the horse, the straps being, after adjustment of the yoke, again placed in engagement with the rack-teeth of the boxes E and firmly retained in position by the adjusting-screws $e^5$. The stiff exterior leather covering C' covers the adjusting mechanism, while suitably-graduated plates $p$ at the outside of the hame-sections indicate in inches and subdivisions of inches the lengths to which the collar may be adjusted. The hame-sections B B are also provided at their upper end with rein-guiding eyes $f^\times f^\times$ in the usual manner, as shown in Figs. 1 and 2.

Conjointly with the adjustment of the collar and hame to the size of the horse's neck it is necessary to adjust the position of the traces relatively thereon, the traces being located somewhat higher when the collar is made longer, and lower when the collar is made shorter. This is accomplished by means of adjustable draft-clips F, which are attached to each hame-section by means of an eye $f'$ at their front ends, while the rear portion $f^2$ of each clip is made U-shaped and closed by a stationary bar $f^3$ of oblong cross-section, which is attached to the rear end of the U-shaped portion $f^2$. On the bar $f^3$ is arranged a sliding clip $f^4$, provided with a T-shaped stud $f^5$, to which the trace is attached, said sliding clip being provided with a notch at its front edge, which is engaged by one of the teeth of a serrated plate $f^6$, that is pivoted to the U-shaped portion $f^2$ and provided with a contracted handle portion, by which it can be readily taken hold of and turned on its pivots into the position shown in dotted lines in Fig. 4, in which position the tooth of the plate $f^6$ releases the notch in the sliding clip $f^4$, so that the same can be shifted up or down on the stationary bar $f^3$, as required. The sliding clip $f^4$ is ordinarily prevented from shifting its position on the bar $f^3$ by the pressure of a flat spring $f^7$, which is attached below the bar $f^3$ to the rear ends of the U-shaped portion $f'$, as shown in Fig. 6. When the yoke-shaped portion C is adjusted higher or lower, the position of its graduated plate on the graduated front part of the hame is read off and the sliding clip $f^4$ then set to the corresponding graduation on the pivoted and toothed plate $f^6$. This is accomplished by first lifting the plate in outward direction, so that its tooth releases the clip, then shifting the clip $f^3$ on the bar $f^2$ in upward or downward direction, as the case may be, and then returning the toothed plate into its former position, so that one of its teeth engages the notched end of the clip, as shown in Figs. 4 and 5. The plate $f^6$ locks the clip rigidly in the required position, while it can be adjusted and reset with little practice by the stableman or other attendant. For convenience of adjustment of the collar the length of the neck can be measured in inches and the collar adjusted to correspond to the length of neck, the graduation on the upper part of the hames indicating when the graduation to which the sliding clip $f^4$ has to be set and locked by the toothed locking-plate $f^6$, the graduations of which correspond to the number of inches of the length of the neck. In this manner the collar can be adjusted before it is placed on the neck of the horse, so as to be ready for immediate use after being placed in position. The position of the traces on the draft-clips corresponds to the length to which the collar is adjusted, so that the draft is exerted at a point which is located at one-third of the height of the collar.

As the hame forms a part of the collar, no separate and detachable hame is required, so that a lighter yet stronger combination collar and hame is obtained.

Having thus described my invention, I claim as new and desire to secure by Letters Patent—

1. The combination, with the collar portions and hame-sections of a combined collar and hame, of slotted and interiorly-toothed boxes attached to the hame-sections and located in the upper ends of the collar portions, an extensible yoke provided with a cross-strap, guide-rods hinged thereto and extending into the hame-sections, means for setting the yoke higher or lower in the boxes, and means for clamping the yoke to or releasing it from said boxes, substantially as set forth.

2. The combination, with the collar portions and hame-sections of a combined collar and hame, of slotted and interiorly-toothed boxes attached to the hame-sections and located in the upper ends of the collar portions, an extensible yoke portion, provided with a cross-strap, hinged and toothed straps extending into said sleeves, and clamping-screws for locking said straps to or releasing them from the interiorly-toothed portions of the boxes, substantially as set forth.

3. The combination, with the collar portions and hame-sections of a combined collar and hame, of adjustable draft-clips attached to the hame-sections, such draft-clip being composed of a U-shaped portion, a stationary bar at the rear end of said U-shaped portion, a sliding clip on said bar, and a toothed and pivoted locking-plate engaging said sliding clip after the same is adjusted, substantially as set forth.

4. The combination, with the collar portions and hame-sections of a combined collar and hame, of adjustable draft-clips attached to the hame-sections, each draft-clip being provided with a U-shaped portion, a stationary bar passing through the rear end of the U-shaped portion, a friction-spring connecting the rear end of the U-shaped portion, a sliding clip provided with a stud for attaching the trace and a notch at its front end, and a locking-plate pivoted to said U-shaped portion and provided with teeth adjacent to the sliding clip, so as to engage the notched end of the clip after the same is adjusted on the bar and lock the same in the required position, substantially as set forth.

In testimony that I claim the foregoing as my invention I have signed my name in presence of two subscribing witnesses.

JOHANNES REIMANN.

Witnesses:
PAUL GOEPEL,
GEO. W. JAEKEL.